May 10, 1932.  H. T. HERR  1,858,014
ENGINE CRANK SHAFT
Filed Feb. 4, 1929  2 Sheets-Sheet 1

WITNESS
E. Lutz

INVENTOR
H.T.Herr.
BY
a. B. Reavis
ATTORNEY

May 10, 1932.  H. T. HERR  1,858,014
ENGINE CRANK SHAFT
Filed Feb. 4, 1929  2 Sheets-Sheet 2
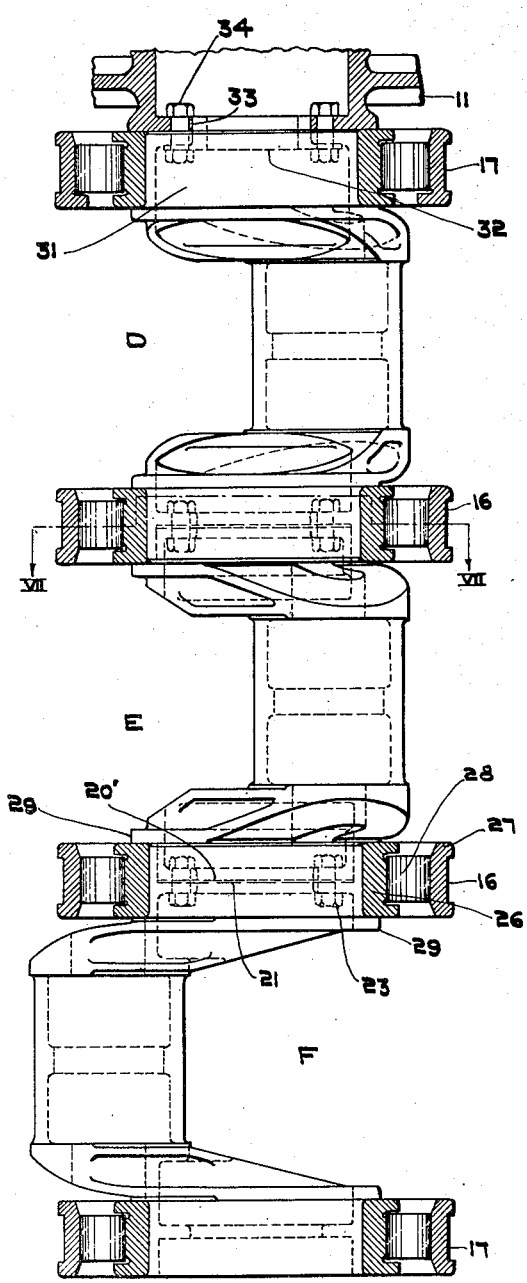
Fig. 3.
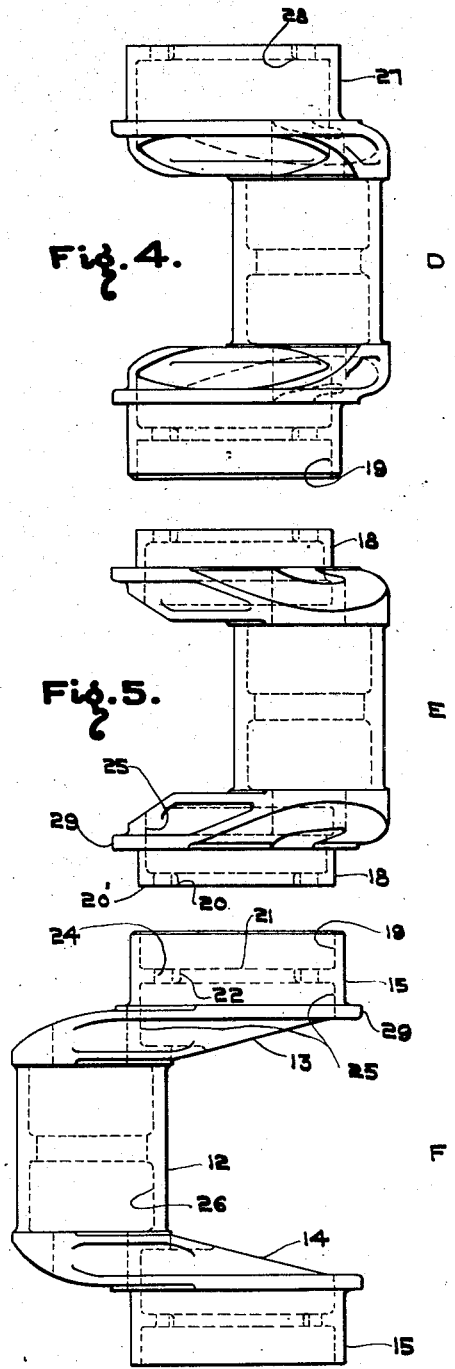
Fig. 4.
Fig. 5.
Fig. 6.
WITNESS
E. Lutz
INVENTOR
H.T.Herr.
BY
a. B. Reavis
ATTORNEY Patented May 10, 1932

1,858,014

UNITED STATES PATENT OFFICE

HERBERT T. HERR, OF PHILADELPHIA, PENNSYLVANIA, ASSIGNOR TO WESTINGHOUSE ELECTRIC & MANUFACTURING COMPANY, A CORPORATION OF PENNSYLVANIA

ENGINE CRANK SHAFT

Application filed February 4, 1929. Serial No. 337,397.

My invention relates to engine crank shafts and particularly to crank shafts of the sectional or built-up type and it has for an object to provide apparatus of the character designated which shall be of strong and rugged construction consistent with the weight thereof and which shall be relatively inexpensive to manufacture.

It has for a further object to provide a crank shaft of the character designated which shall be composed of a plurality of interfitting portions or sections having improved means for attaching the adjacent sections to each other so as to provide, in effect, a single, unitary, structural element.

It has for still another object to provide a crank shaft composed of a plurality of sections joined or connected together, the joints or connections being so formed and arranged as to be supported directly by the main bearings of the engine, whereby the joining means connecting the adjacent sections are not required to withstand the engine working forces transmitted between the crank shaft and the engine main bearings.

It has for still another object to provide a sectional crank shaft wherein the respective end portions of each connected section are directly supported in the main bearings of the engine and wherein adjacent crank shaft sections are joined by a form of sleeve construction so arranged as to provide a connecting joint having a maximum degree of strength and rigidity.

It has for still another object to provide a crank shaft of the character designated which shall be adapted for use with engines of the multi-cylinder type and especially with engines having main bearings of the circular or non-split type.

These and other objects are effected by my invention, as will be apparent from the following description and claims, taken in connection with the accompanying drawings, forming a part of this application; in which, Fig. 1 is a view, in elevation, of one form of crank shaft arranged in accordance with my invention and showing the engine main bearings assembled thereon;

Fig. 3 is a view, partly in section and partly in elevation, of a portion of the crank shaft shown in Fig. 1 together with the main engine bearings associated therewith and which illustrates the form of structure employed for joining or connecting the adjacent crank shaft sections to each other;

Figs. 4 to 6 are detail views, in elevation, of the sections of the crank shaft portion shown in Fig. 3; and, Fig. 7 is a view, in section, taken on the line VII—VII of Fig. 3.

Figure 1:
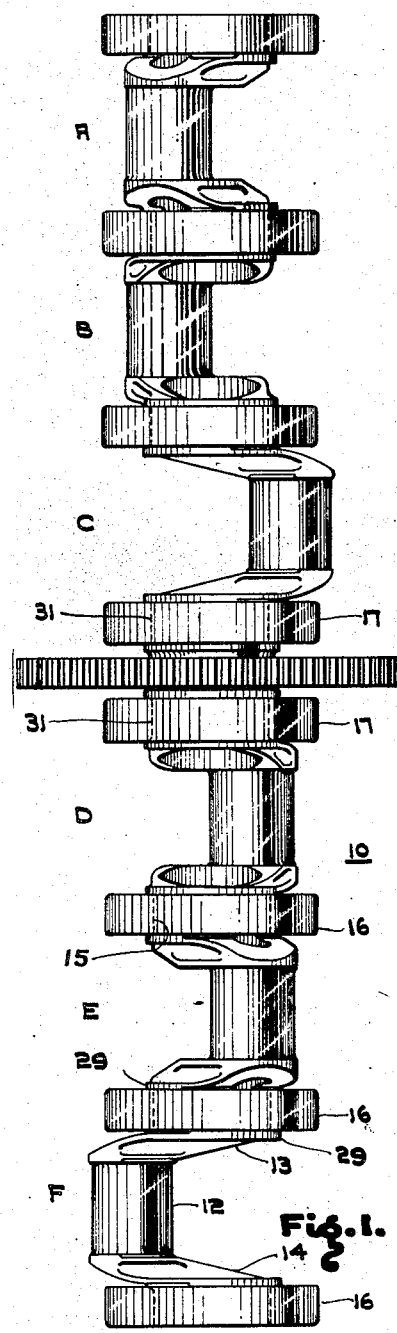

In engines employing main bearings of the non-split or circular type, for example roller or ball bearings, it is generally the practice to manufacture the crank shaft in one piece and to install the respective main bearings upon the crank shaft by threading them over the end of the crank shaft, passing them around the cheeks of the chank shaft and over the crank pin journals, etc., until they have been located adjacent to their respective journal portions. Such a practice is generally followed with internal combustion engines of the high speed type such as are employed in the propulsion of air craft. This practice requires that the bearings be made of a large enough diameter to permit this threading process; and, consequently, after the bearing is located in its correct position upon the shaft, suitable split bushings or distance pieces must be fitted between the journals of the shaft and the bore of the bearings in order that the shaft may be firmly supported in the bearings. Such an arrangement is somewhat objectionable in that larger bearings than necessitated by the imposed load conditions must be employed, the weight is increased and, in addition, the numerous fitting pieces or bushings interposed between the crank shaft and the bearings may, from the operation of the engine, become loosened and the engine consequently rendered inoperative.

It has, therefore, been proposed to employ crank shafts of the built-up type, that is, crank shafts composed of a plurality of sections disposed in end-to-end relation and joined or connected together, whereby the main bearings may be installed upon their respective journal portions before the crank shaft sections are joined or assembled together. Such an arrangement possesses the marked advantage that smaller main bearings may be employed, the assembly of the bearings upon the crank shaft is facilitated and the requirement for inter-fitting bushing or distance pieces is eliminated. However, crank shafts of this character, as heretofore constructed, have embodied a very serious disadvantage in that the joints or means employed for connecting the adjacent sections to each other were utilized to transmit the engine working forces between the main bearings and the crank shaft. It has been found difficult to develop a form of joining means capable of reliably transmitting such forces without failure or breakage of the structure.

In some cases, sectional crank shafts have been proposed which were not subject to the foregoing objections; but, in these instances, the structure joining the crank shaft sections was necessarily so arranged that the assembled crank shafts themselves were structurally weak and required the assistance of the main bearings in order to give them the required strength and rigidity so that in the latter respects, they were not the equivalent of a solid or one-piece crank shaft.

I have, therefore, conceived of a form of sectional crank shaft which is so arranged that the end portions of the respective sections are each retained directly in the main bearings so that the engine working forces imparted to each crank section are transferred directly by that crank shaft section to the engine main bearings. In this way, the bolts or joining means connecting each adjacent section need not transmit these engine working forces and hence are utilized primarily for transmitting the torque of the crank shaft. In addition, I embody in the crankshaft an improved form of spigot sleeve-type joint which is so constructed and arranged that the respective crank shaft sections are secured together in such a manner that the assembled crank shaft possesses a maximum degree of strength and rigidity and, in the latter respects, may be said to be the full equivalent of a one-piece, unitary crank shaft.

Referring now to the drawings for a more detailed description of my invention, I show, in Fig. 1, a crank shaft 10 provided at its central portion with a gear 11 for transmitting torque from the crank shaft to the member to be driven. Although the gear 11 may be located anywhere along the axis of the crank shaft, or, at either end of the crank shaft, I prefer to locate it in a central portion, as shown, in order that the torsional deflection resulting from the transmission of power may be reduced or, conversely, in order that a smaller diameter crank shaft may be employed for a given deflection.

Figure 2:
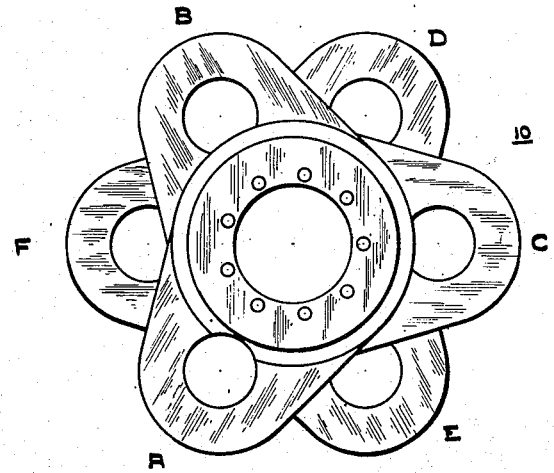
Fig. 2 is a plan view of the crank shaft shown in Fig. 1.

The crank shaft illustrated by way of example, is of the six-throw type and comprises sections A to F. It is to be understood, however, that my invention is equally applicable to forms of crank shafts other than that illustrated and having different numbers of crank throws from that shown. Each section embodies a crank pin portion 12 and crank cheeks 13 and 14, the crank pins being angularly disposed with respect to each other, such as illustrated in Fig. 2. Interposed between adjacent crank cheeks and crank pins are bearing portions 15 each of which is provided with a circular or non-split main engine bearing 16. Preferably, the bearings 16 are of the roller or ball type and one of the bearings on each side of the gear 11, such as the bearings 17, may serve as both a radial bearing and a thrust bearing in order to prevent axial displacement of the crank shaft.

Referring now to Figs. 4 to 6, it will be seen that the crank shaft sections are formed separately and it will be apparent that the adjacent end portions of the respective sections are arranged so as to fit within each other. Referring to the section E, it will be noted that this section is provided with male end portions 18 formed so as to fit into cooperating female end portions 19 provided on the adjacent sections F and D. The male end portions 18 are provided with circular flanges 20 having joining faces 20' which cooperate with joining faces 21 of internal circular flanges 22 provided in the female end portions 19. In other words, the telescoping or interfitting annular parts 18 and 19 provide spigot joints.

In assembling the sections together, the bearings 16 and 17 are first of all fitted upon the exterior surfaces or bearing portions 15 of the female projecting portions 19 after which the male portions 18 are inserted into the female portions 19. Thereafter, a plurality of bolts 23 are inserted in circumferentially disposed bolt holes 24 and the flanges 20 and 22 and their associated crank shaft sections securely joined together. Each crank cheek is provided with a circular opening 25 extending inwardly to the flanges 20 or 22, thereby providing access to the bolts 23 from either side of the bearing and also reducing the weight of the crank shaft structure. The weight of the crank shaft structure may be further reduced by boring out the crank pins 12, as at 26. Preferably, the flanges 20 and 22, as well as their connecting bolts, are arranged, as illustrated, so that no portion thereof projects beyond the crank cheeks. In this way, the joining means is entirely confined within the crank shaft structure and cannot, in any way, interfere with the proper operation of the connecting rods (not shown) and other moving parts of the engine.

From an inspection of Fig. 3, it will be apparent that the flange faces 20' and 21 are disposed in a plane or planes located approximately central with respect to the crank shaft supporting bearings. As a result, each and every crank shaft end is supported directly in a main bearing and hence the reaction set up by the bearings against the working forces of the engine are transmitted directly between each crank shaft section and its associated bearings so that the bolts 23 are not required to withstand such forces. The bolts 23, therefore, serve primarily to transmit torque and to retain the several crank shaft sections together so as to provide, in effect, a single unitary structure. Preferably, alternate sections, as for example E, are provided with only male projecting portions while the remaining sections, such as F for example, are provided with only female projecting portions. In this way, only two types of sections are required and any size crank shaft may be produced by assembly of the required number of sections of these two types.

Figure 7:
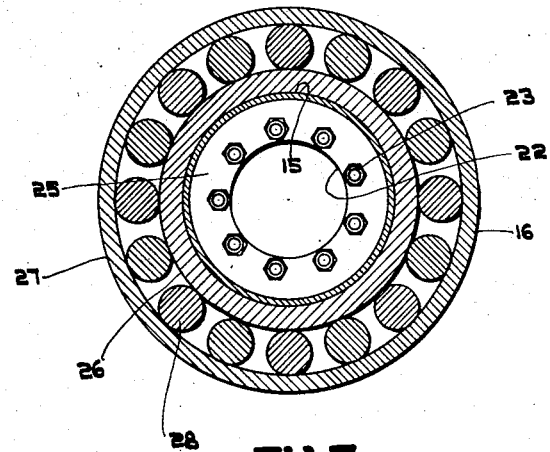

As shown in Fig. 7, each of the bearings 16 is composed of inner and outer relatively rotatable raceway rings 26 and 27 with antifriction ball or roller members 28 interposed between the rings. Each crank cheek is, therefore, provided with a flange 29 formed to engage the inner ring 26 of the bearing 16 so that the latter is held firmly between the opposing flanges 29 when the crank shaft sections are assembled together. Preferably, the length of each male portion 18 is slightly less than the depth of each female portion 19 so that when the crank shaft sections are assembled, as shown in Fig. 3, there is a slight clearance intervening between the adjacent flange faces 20' and 21 so that the bolts 23 may be utilized to draw the flange faces toward each other and incidentally securely clamp the inner rings of the respective bearings 16 between the adjacent crank shaft sections. In securing the crank shaft to the gear 11, the end portions 31 of the sections D and C may be formed so as to provide an inner flanges 32 adapted to be secured to a hub 33 of the gear 11 by means of a plurality of bolts 34.

From the foregoing, it will be apparent that I have devised a form of crank shaft which is of the sectional or built-up type and which readily facilitates assembly of bearings of the circular or non-split type upon the crank shaft. It will be further apparent that I have provided an improved type of sleeve or spigot connection for so joining the crank shaft sections to each other that, when assembled, the entire crank shaft is the equivalent, structurally, of a single unitary element. It will be still further apparent that the crank shaft sections are so joined that the bolts connecting the sections are not required to transmit working forces between the crank shaft and the bearings, these forces being transmitted directly from the crank shaft to the bearing and not necessarily through the bolts. All of the foregoing features cooperate to provide a form of crank shaft which possesses all of the desirable characteristics required in the construction and operation of modern high speed internal combustion engines. While I have shown and described my improved form of crank shaft in connection with bearings of the non-split or circular type, nevertheless it is obvious that my crank shaft is also adapted for use in engines embodying bearings of the split or removable cap type.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an engine crank shaft structure, the combination of a plurality of detachable crank shaft sections, each section embodying a crank pin portion, a journal bearing, a projecting end portion provided on one of the sections and supported in the journal bearing, a projecting end portion provided on the other section and disposed within the first-named end portion radially extending flanges provided interiorly of the projecting portions and means for detachably securing said flanges together, said sections being so formed as to afford, when secured together, access to said securing means.

2. In an engine crank shaft structure, the combination of a plurality of crank shaft sections, each section embodying a crank pin portion and crank cheeks secured thereto, a projecting sleeve portion provided on one of the crank shaft sections and secured to the crank cheek thereof, a projecting end portion privided on the adjacent end of the second crank shaft section and secured to the crank cheek thereof, the projecting portion associated with the second crank shaft section extending within the sleeve portion of the first crank shaft section, a flange member provided on the interior of said sleeve portion, and means for detachably securing said flange member to the projecting portion of the second crank shaft section.

3. In an engine crank shaft structure, the combination of a plurality of crank shaft sections, each section embodying a crank pin portion and crank cheeks secured thereto, a projecting sleeve portion provided on one of the crank shaft sections and secured to the crank cheek thereof, a projecting end portion provided on the adjacent end of the second crank shaft section and secured to the crank cheek thereof, the projecting portion associated with the second crank shaft section extending within the sleeve portion of the first crank shaft section, an annular flange member provided on the interior of said sleeve portion, and a plurality of circumferentially spaced elements for detachably securing said flange member to the projecting portion of the second crank shaft section.

4. In an engine crank shaft structure, the combination of a plurality of crank shaft sections, each section embodying a crank pin portion and crank cheeks secured thereto, a projecting sleeve portion provided on one of the crank shaft sections and secured to the crank cheek thereof, a projecting end portion provided on the adjacent end of the second crank shaft section and secured to the crank cheek thereof, the projecting portion associated with the second crank shaft section extending within the sleeve portion of the first crank shaft section, an annular flange member provided on the interior of said sleeve portion, an annular flange member provided on the projecting portion of the second crank shaft section, and a plurality of circumferentially spaced elements for detachably securing the flange members to each other.

5. In an engine crank shaft structure, the combination of a plurality of detachable crank shaft sections, each section embodying a crank pin portion, a tubular projecting end portion provided on one of the sections, a tubular projecting end portion provided on the other section, a journal bearing cooperating with said projecting end portions for supporting the crank shaft, radially-extending flanges provided in the bore of each of the tubular projecting portions, and means for detachably securing said flanges together, said flanges being located intermediate of the lateral ends of the journal bearing and said sections being so formed as to afford, when secured together, access to said securing means.

6. In an engine crank shaft structure, the combination of a plurality of crank shaft sections, each section embodying a crank pin portion, a female sleeve portion projecting axially from one section, a male sleeve portion projecting axially from the other section and fitting within the female portion, a journal surface provided upon the exterior surface of the female sleeve portion, a crank shaft supporting bearing cooperating with said journal surface, an inwardly-projecting flange provided on each sleeve portion, and means for detachably securing said flanges to each other.

7. In an engine crank shaft structure, the combination of first and second crank shaft sections, each section embodying a crank pin portion, a projecting sleeve portion provided on the first section, a journal bearing cooperating with the exterior surface of said sleeve portion for supporting the crank shaft, a radially-extending flange member provided within the bore of said sleeve portion, a projecting sleeve portion provided on the second crank shaft section, said second projecting sleeve portion extending within the first sleeve portion, a radially-extending flange member provided on the end portion of the second sleeve portion and disposed adjacent to the flange member of the first sleeve portion, and means for detachably securing said flanges to each other.

8. In an engine crank shaft structure, the combination of a plurality of crank shaft sections each embodying a crank pin portion, a journal portion eccentrically disposed with respect thereto and a crank cheek for connecting the crank pin portion to the journal portion, the journal portions of adjacent crank shaft sections being disposed in closely spaced relation, an annular anti-friction bearing cooperating with adjacent journal portions for supporting the crank shaft, said bearing embodying inner and outer relatively rotatable members, bearing surfaces provided on the respective crank cheeks and directly engaging oppositely disposed lateral faces of the inner bearing member, and means for securing the closely spaced adjacent journals to each other and providing for clamping of the inner bearing member against adjacent crank shaft sections.

9. In an engine crank shaft structure, the combination of a plurality of crank shaft sections each embodying a crank pin portion, a journal portion eccentrically disposed with respect thereto and a crank cheek for connecting the crank pin portion to the journal portion, said journal portions comprising axially extending sleeves having flange members provided in the bore thereof, the sleeve of adjacent crank shaft sections being disposed in closely spaced relation, an annular, anti-friction bearing cooperating with adjacent journal portions for supporting the crank shaft, said bearing embodying inner and outer relatively rotatable members, means associated with the respective crank shaft sections for engaging oppositely disposed lateral faces of the inner bearing member, and means for securing the closely spaced flanges of adjacent journal portions to each other and providing for clamping of the inner bearing member between adjacent crank shaft sections.

10. In an engine crank shaft structure, the combination of a plurality of detachable crank shaft sections disposed in end-to-end relation, each of said crank shaft sections embodying a crank pin portion, axially-extending end portions and crank cheeks for connecting the end portions to the crank pin portions, the end portions associated with alternate sections comprising female sleeve portions and the end portions associated with the remaining sections comprising male portions, means for detachably securing the respective male portions to adjacent female portions, and bearings cooperating with each female portion for supporting the crank shaft, said crank sections being provided with openings communicating with said securing means so as to provide access to the securing means when said sections are secured together.

11. In an engine crank shaft structure, the combination of a plurality of crank shaft sections disposed in end-to-end relation, each of said crank shaft sections embodying a crank pin portion, axially extending end portions and crank cheeks for securing the end portions to the crank pin portions, the end portions associated with alternate sections comprising female sleeve portions and the end portions associated with the remaining sections comprising male portions, flange members provided upon and located intermediate of the ends of each female sleeve portion, said flange members cooperating with flange members provided on the male sleeve portions for securing the male portions within the adjacent female portions, and circular, non-split bearings cooperating with each female portion for supporting the crankshaft.

In testimony whereof, I have hereunto subscribed my name this 31st day of January 1929.

HERBERT T. HERR.